June 22, 1965

T. A. INSOLIO 3,190,518

APPARATUS FOR CUTTING, TRANSPORTING AND
DISTRIBUTING GLASS SHEETS

Filed Nov. 7, 1962

INVENTOR.
Thomas A. Insolio

BY Webb, Mackey + Burden

HIS ATTORNEYS

June 22, 1965 T. A. INSOLIO 3,190,518
APPARATUS FOR CUTTING, TRANSPORTING AND
DISTRIBUTING GLASS SHEETS
Filed Nov. 7, 1962 10 Sheets-Sheet 2
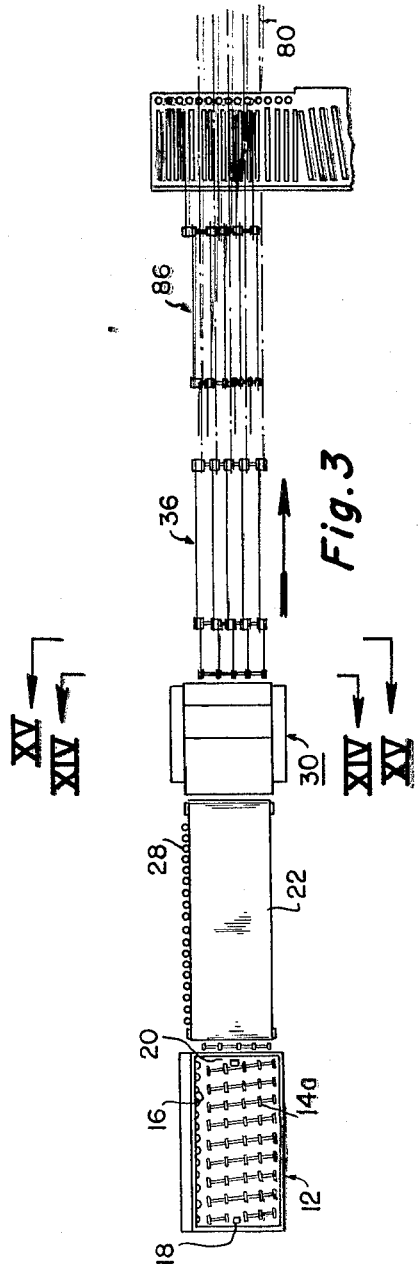
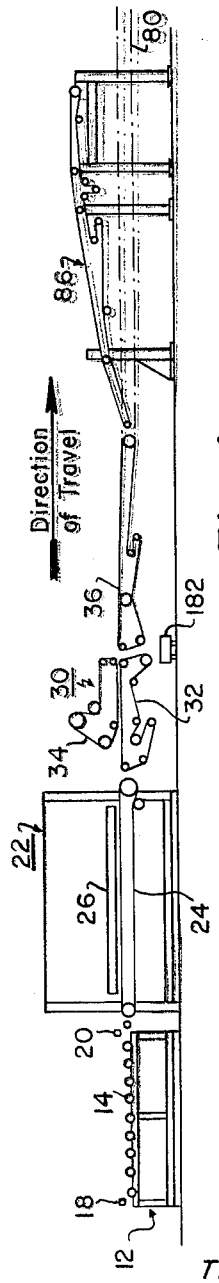
INVENTOR.
Thomas A. Insolio
BY Webb, Mackey & Burdorn
HIS ATTORNEYS

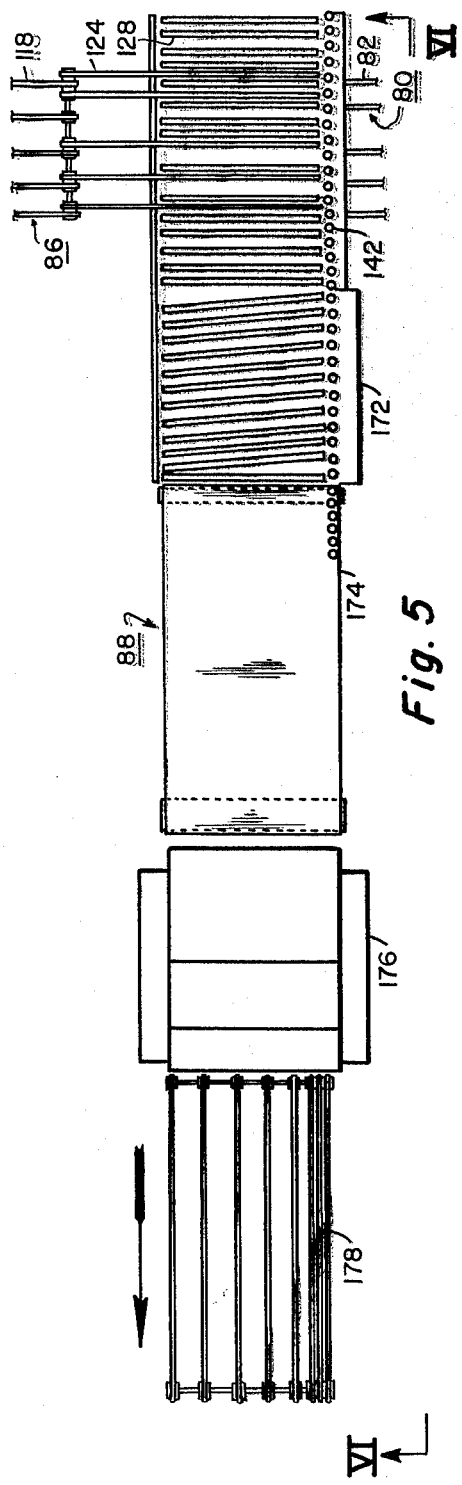
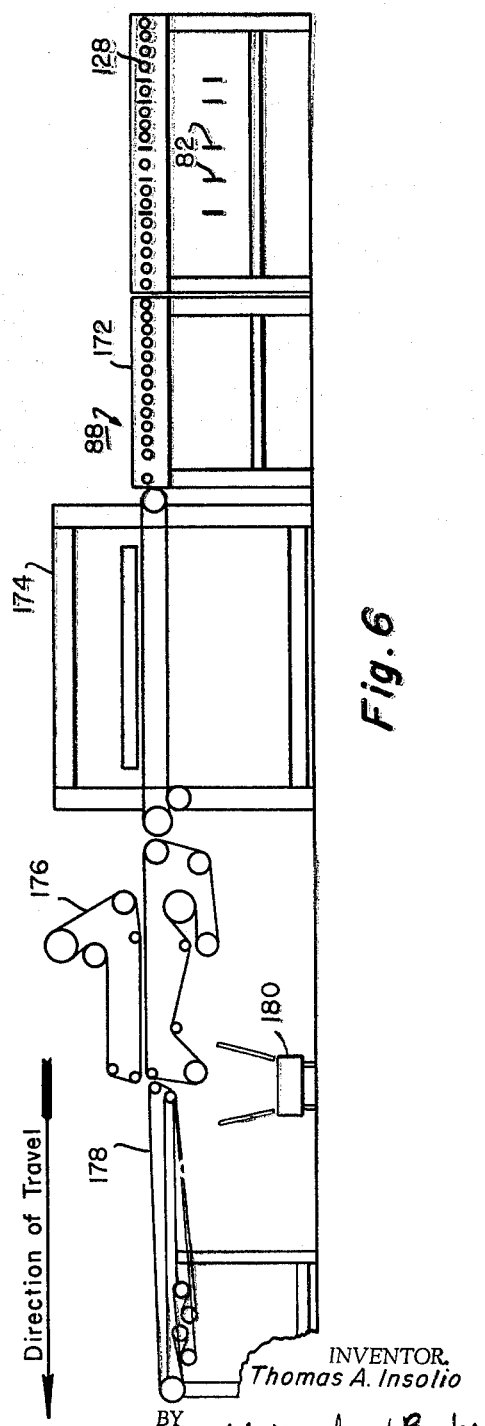

June 22, 1965
T. A. INSOLIO
3,190,518
APPARATUS FOR CUTTING, TRANSPORTING AND
DISTRIBUTING GLASS SHEETS
Filed Nov. 7, 1962
10 Sheets-Sheet 4
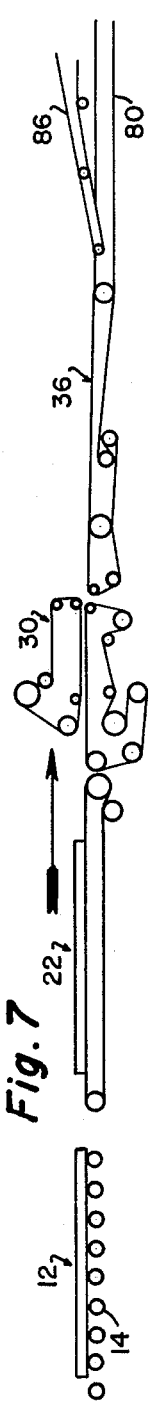
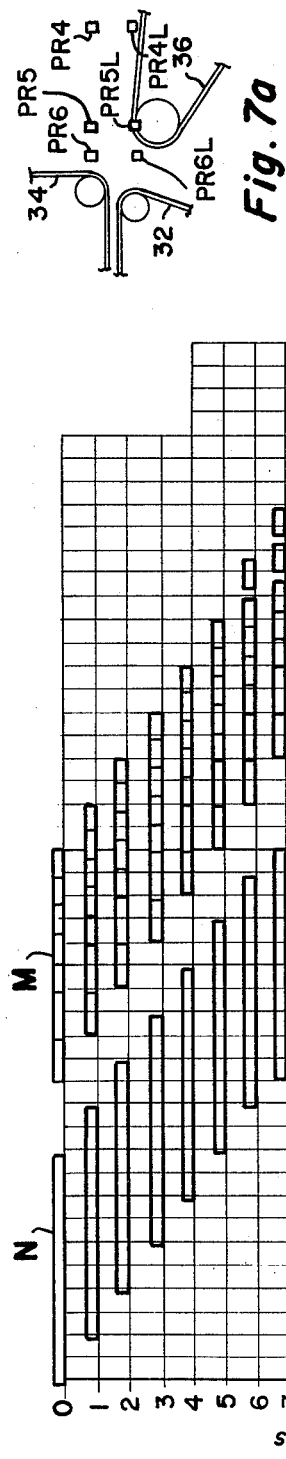
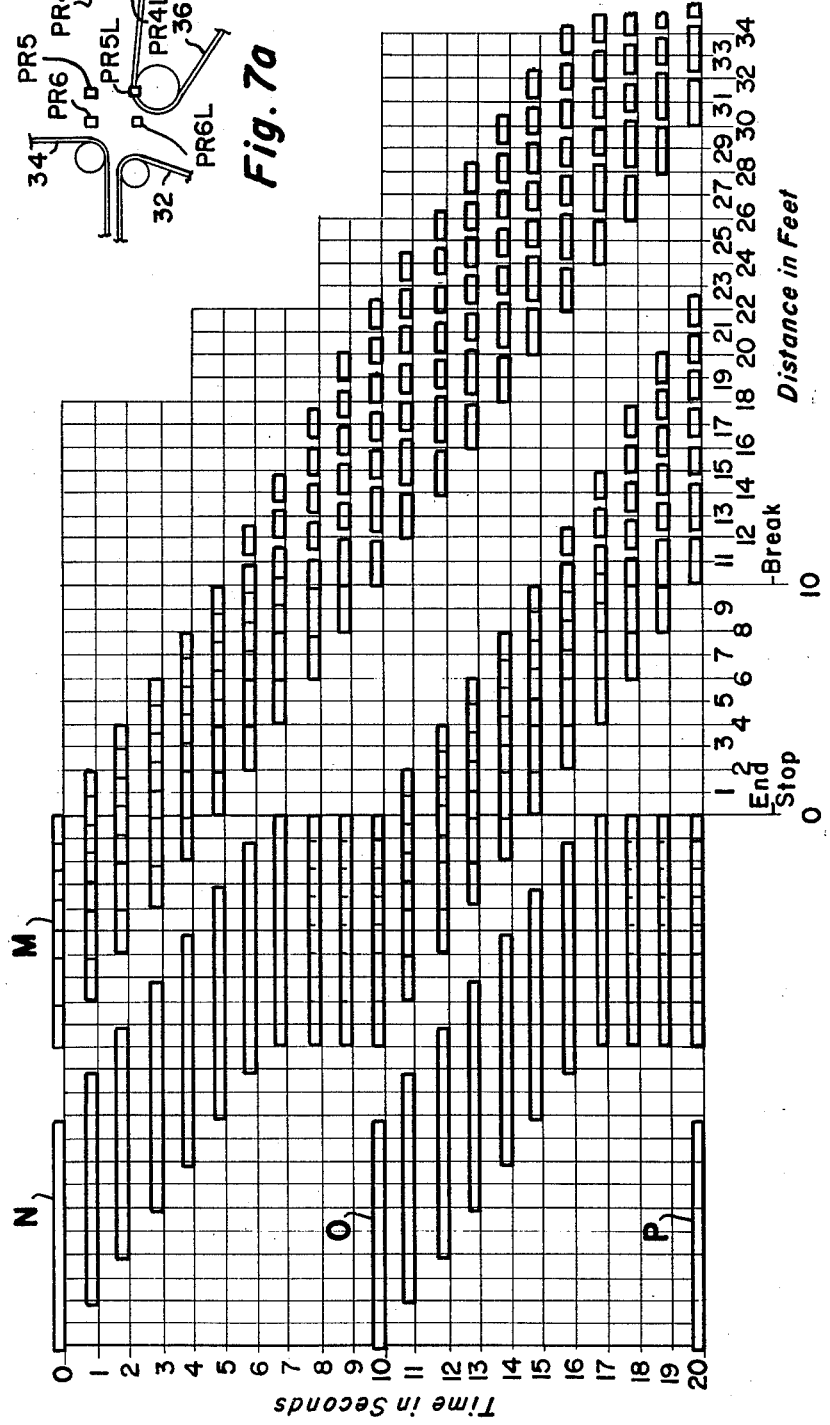

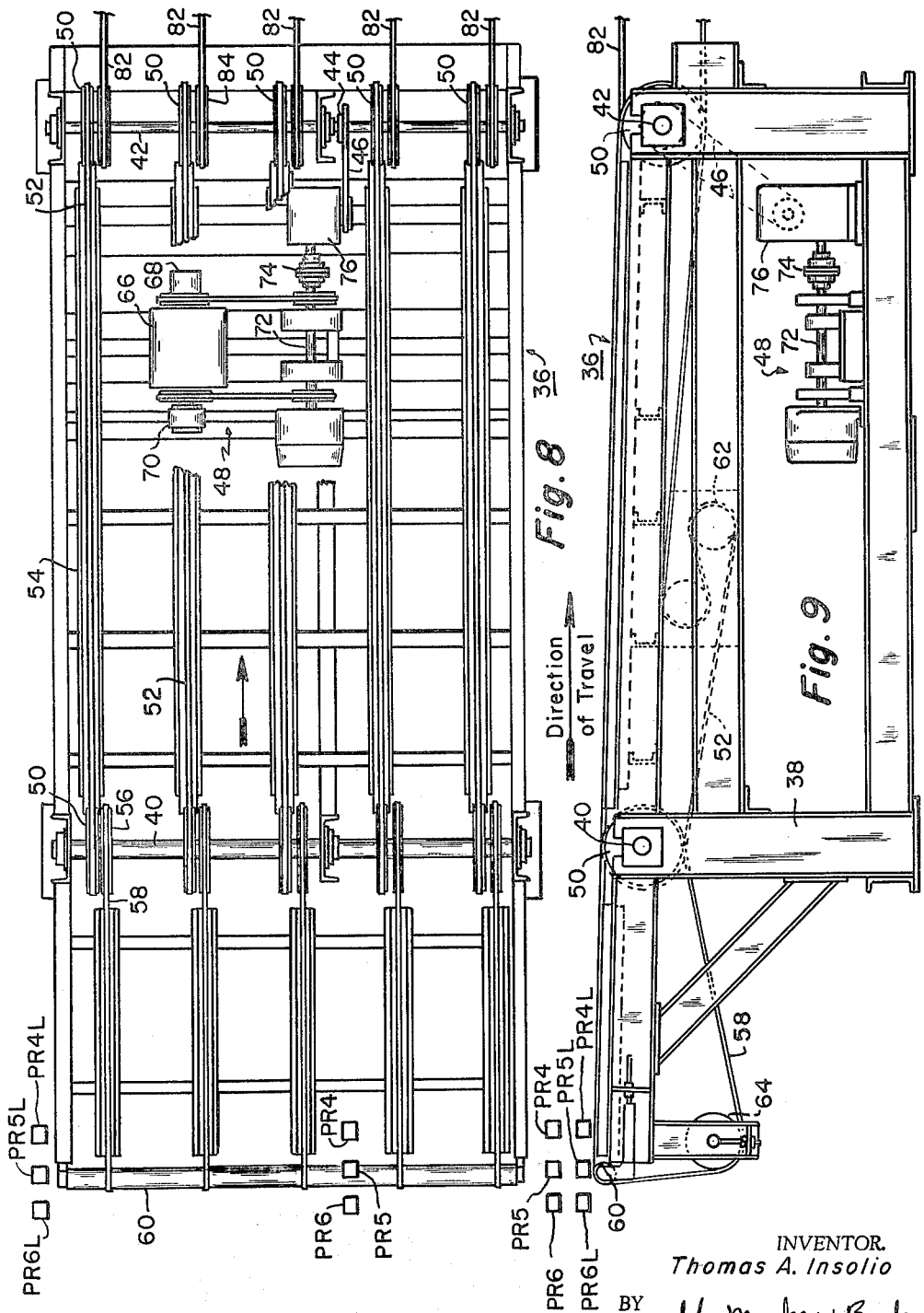

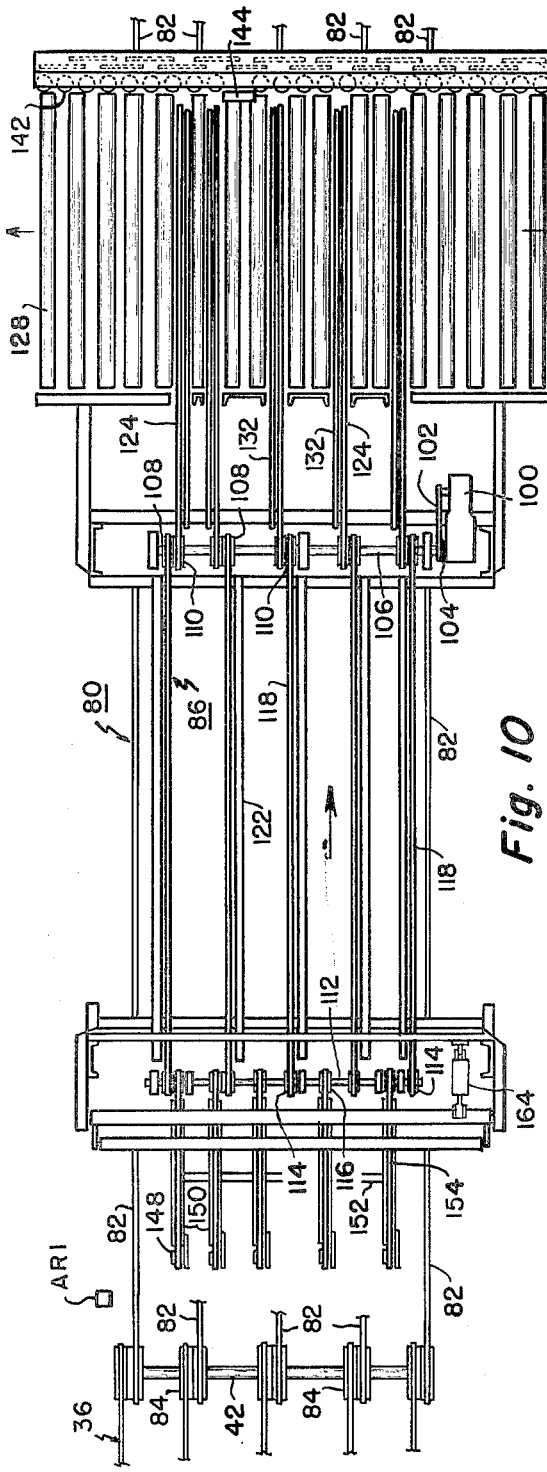
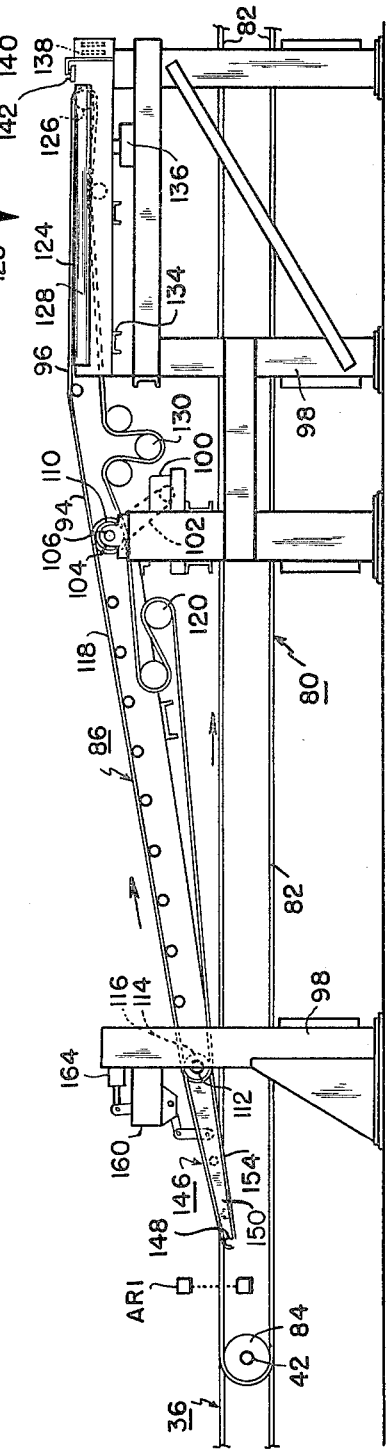
Fig. 10
Fig. 11

INVENTOR.
Thomas A. Insolio

BY Webb, Mackey + Burden
HIS ATTORNEYS

INVENTOR.
Thomas A. Insolio

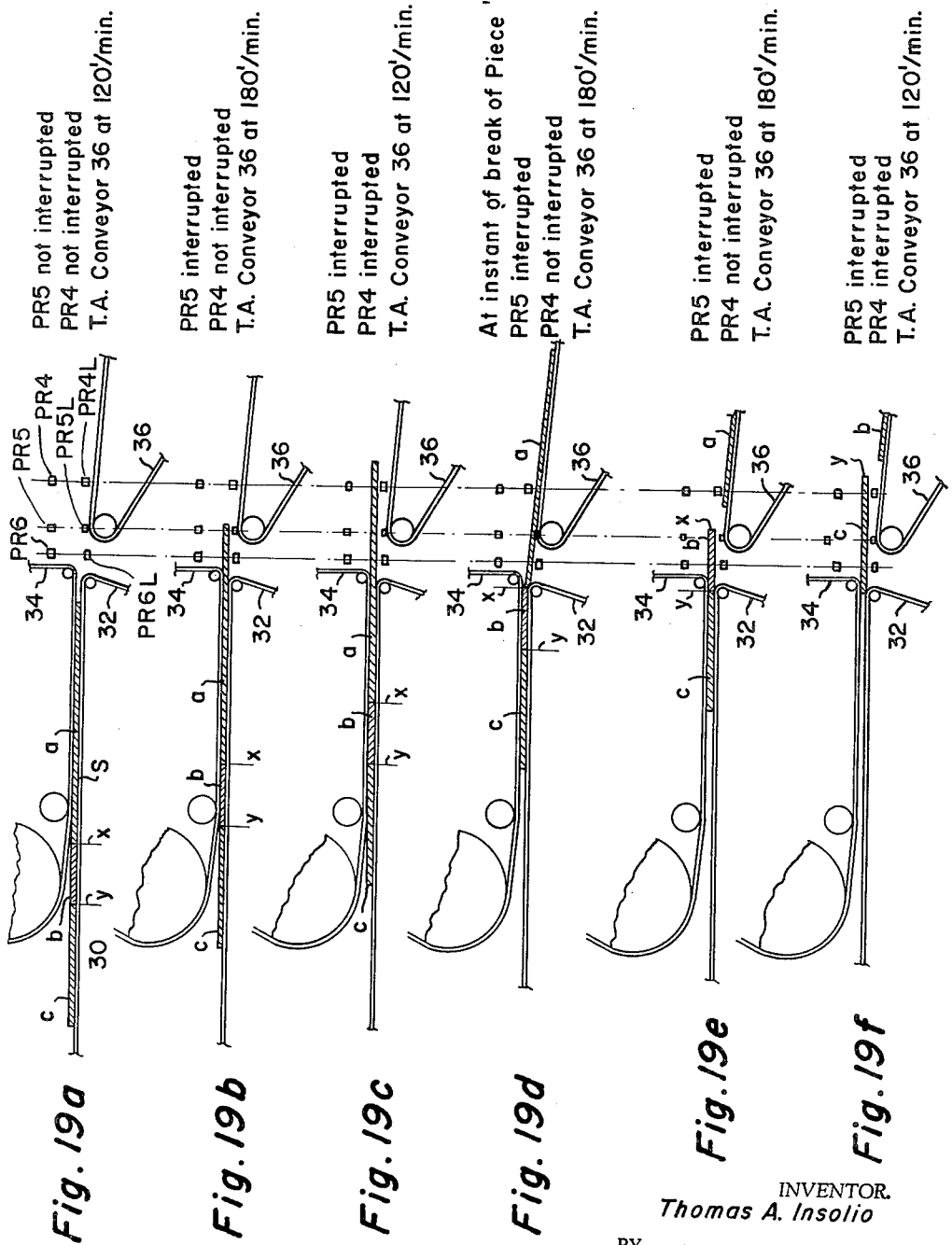

३,१९०,५१८
APPARATUS FOR CUTTING, TRANSPORTING
AND DISTRIBUTING GLASS SHEETS
Thomas A. Insolio, Jeannette, Pa., assignor to American-
  Saint Gobain Corporation, Kingsport, Tenn., a corpo-
  ration of Delaware
        Filed Nov. 7, 1962, Ser. No. 235,932
               6 Claims. (Cl. 225—96.5)

This invention relates to an apparatus for cutting, transporting and distributing glass sheets.

In the manufacture of sheet glass, an endless sheet of glass is continuously drawn from a glass making machine. Apparatus is provided at the drawing machine to cut the endless sheet at predetermined intervals into large sheets commonly called stock sheets. The stock sheets are then cut into pieces of preselected sizes. In a large glass producing plant a very large number of different sized pieces is cut each day from a large variety of stock sheets. The planning, scheduling and processing of the large number of different sized pieces is a very complex operation.

A major economic factor encountered in the cutting of the stock sheets is to obtain the best yield of usable pieces of glass from a given sized stock sheet and yet supply the desired sized pieces of glass. This requires decision making in the planning and scheduling phases to obtain the optimuum use of the glass sheet. Such optimum use most often requires that a plurality of different sizes be cut from a given stock sheet. It is readily apparent that another limiting factor in the processing and cutting of glass sheets is the speed at which the stock sheets can be processed and cut into pieces of preselected sizes. This is especially true where frequent scheduled changes in the sizes are necessary. Manual hand cutting and handling of the glass sheets is a slow method and yet this method is still extensively employed in many major producing plants. If, therefore, a method and apparatus could be provided for increasing the speed at which stock sheets can be cut into preselected sizes, transported and distributed, greater productivity could be obtained and greater economic gains accomplished in the glass making industry.

My method for solving the above size scheduling problem is to perform the cutting operations in essentially two steps. The stock sheet is first scored transversely to its direction of travel and conveyed through a breaker which breaks the sheet along the scored lines into what are called "cross-cut strips." The widths of the cross-cut strips thus produced may be different. Some of these strips may be defective or otherwise undesirable and are disposed of when produced; each of the others is transported to a predetermined secondary cutting line by a take-away and a distributing conveyor where it is further scored and broken into preselected sizes or lites having one dimension equal to the width of the cross-cut strip.

One prerequisite with any system that depends on a high rate of speed for its productivity is the proper timing of the various components in the system, i.e., the cutting component, the breaking component, the take-away conveyor and the distributing conveyor, so that the sheets or pieces produced therefrom travel or flow as a smooth stream through all components. Consequently, it is important that each component be capable of performing its function of processing as efficiently as possible within a predetermined time period to assure that optimum productivity is achieved.

To achieve maximum efficiency in a system such as the present apparatus involving a cutting operation and take-away and distributing conveyors, it is essential that uniform spacing be achieved between the cross-cut strips on the take-away conveyor so that such spacing may be minimized insofar as possible. The objective is to keep all the strips broken from one sheet in as "tight" a group or train as possible. By controlling the spacing width between the cross-cut strips, the end-to-end distance of each group or train is, to some extent, also controlled. Such control of the length of a train is essential in minimizing the required length of the take-away conveyor. A take-away conveyor must be long enough to hold all the strips of one train at one time, and, short enough to be sure that the last strip is off this conveyor before the first strip of the next sheet is on it. Where all of the cross-cut strips are the same width, a fixed increase in speed of the take-away conveyor which follows the breaking component can be regulated to provide the desired spacing. Where, however, all of the cross-cut strips are not of the same width, any constant speed of the take-away conveyor will result in non-uniform spacing between the different width strips.

Where preselected cross-cut strips are transferred from a primary line to secondary lines extending transversely to the primary line, additional problems are encountered if high speed transportation and distribution to the secondary lines are desired. The transfer device must be able to select one cross-cut strip, transfer it to a secondary line and permit the remaining strips to continue down the primary line to other secondary lines. The rapidity at which the transfer must be made eliminates any device which has a large mass or which would develop undesirable inertial forces during the transfer. A transfer means is required which will accommodate a wide variety of widths without need for adjustments.

The number of changes of direction of the stock sheet or the pieces resulting therefrom must be held to a minimum. Such movements transverse to the primary line introduce complex equipment. In my method and apparatus the cutting and breaking of the stock sheet into cross-cut strips are effected without a change in the direction of travel. A transverse change in direction is made only to transfer a cross-cut strip into a secondary cutting and breaking line.

Another difficulty encountered in any continuous system is the monitoring of the various components so that a malfunction in one component is quickly detected and the system is not permitted to continue until the malfunction has been corrected. For example, where the stock sheet of glass is to be scored and broken to provide a given number of cross-cut strips or where a cross-cut strip is to be scored and broken to provide a given number of pieces or lites, and less or more than the preselected number emerge from the breaker component, this malfunction must be immediately detected and corrected.

By my improved method and apparatus, it is possible increase the velocity at which glass sheets are transported along a primary conveyor line. I have provided a means for uniformly spacing the different sized pieces on a take-away conveyor as they emerge from the breaker, and also have provided a means for rapidly transferring preselected cross-cut strips from the primary processing line to transversely extending secondary lines. I have provided a continuous inspection or counting device which senses any improperly broken-out sizes so that the malfunction can be quickly corrected.

Briefly, my invention includes a plurality of components arranged in endwise linear relation and forming a primary processing line. Extending transversely to the primary processing line are a plurality of secondary lines, each of which includes substantially the same plurality of components arranged in endwise linear relation. The primary line has a receiver for the stock sheet. An indexing table is positioned to receive the stock sheet from the receiver and to align an edge portion along a predetermined line. A scoring or cutting component is arranged to receive the stock sheet from the indexing table and a cutter scores the stock sheet along a plurality of predetermined longitudinally spaced transverse lines, thereby providing a plurality of parallel transverse cross cuts or scores. The scored stock sheet is conveyed without change of direction onto and through a breaker device which breaks the glass sheet along the cross-cut scores to provide a plurality of cross-cut strips from the original stock sheet. A take-away conveyor receives the cross-cut strips as they emerge from the breaker and positions the strips with substantially uniform spaces therebetween. Narrow strips cut from the ends of the stock sheet, or from the body to remove defects, fall between the breaker conveyor and the take-away conveyor and are disposed of. The take-away conveyor then conveys the cross-cut strips to a distributing conveyor which is in endwise linear relation to the take-away conveyor.

Positioned above the distributing conveyor at spaced intervals are a plurality of transfer conveyors which include means to selectively pick off preselected cross-cut strips from the distributing conveyor and convey the strips thus picked off to secondary lines which extend transversely of the distributing conveyor. The remaining cross-cut strips not picked off at a transfer point are conveyed by the distributing conveyor to succeeding preselected secondary lines.

Each stock sheet scored and broken transversely at the primary cutter and breaker yields a series or train of cross-cut strips. All cross-cut strips below a predetermined minimum width fall between the breaker conveyor and the take-away conveyor and are disposed of immediately after the break-out operation. The remainder of said train is conveyed by the take-away conveyor, the distributing conveyor and the transfer conveyors to the transversely extending secondary lines. Each secondary line receives one or more of the leading cross-cut strips approaching it on the distributing conveyor. If consecutive strips on the distributing conveyor are identical in width and of good quality, they are transferred onto the transfer conveyor leading to the first secondary line it encounters. If the leading strip of a train on the distributing conveyor is defective, it is transferred onto the transfer conveyor leading to the first secondary line it encounters along with the one or more (if identical in width) good strips behind it. The defective strip need not be of identical width as the good strips. The defective strip is disposed of by directing it away from the secondary line at this transfer station.

The transversely extending secondary lines include indexing devices which align one cut edge of the cross-cut strip along a predetermined line. Another glass cutter or scoring device is provided to score the strips along lines transverse to the cross-cut edges of the strip. A breaker device breaks the strip along scores and a takeaway device conveys the twice cut pieces to a stacker or storage device.

Control devices are included to sense and count the number of cross-cut strips emerging from the breaker device and compare this number with the predetermined number of strips intended to be cut from the stock sheet when the cutter and breaker are functioning properly. Other control means are provided which include sensing means which control the speed of the take-away conveyor relative to the speed of the breaker conveyor in order to:

(1) insure that the speeds of the two conveyors are approximately the same so as not to scratch the glass when the glass in the breaker, but not yet broken off, is in contact with the take-away conveyor, and (2) drive the take-away conveyor at a higher speed than the breaker conveyor to uniformly space broken-off, cross-cut strips on the take-away conveyor even though the cross-cut strips are of different widths.

Control means is also provided to actuate the various transfer conveyors to transfer preselected cross-cut strips from a distributing conveyor to preselected secondary lines where they are subjected to another cutting and breaking operation.

With my method and apparatus it is now possible to rapidly cut a stock sheet of glass into preselected sizes first along lines extending transversely of the longitudinal axis of the sheet to produce cross-cut strips, and without change in the direction of travel of the sheet, and then to change the direction of travel of the cross-cut strips and cut them in a direction transverse to their longitudinal axes, all without manually handling either the stock sheet or the cross-cut strips. It is possible also to plan and schedule a variety of sizes from one stock sheet and to cut, break and distribute these automatically with a change in conveyed direction only after each size has been cut and broken from the stock sheet.

The method and apparatus which comprise this invention accomplish the foregoing and other functions in a novel way as will now be explained. Further features, objects and advantages will either be specifically pointed out or become apparent when, for a better understanding of the invention, reference is made to the following written description, taken in conjunction with the accompanying drawings, which form a part hereof, and in which:

FIGURE 3 is an enlarged plan view of a portion of the primary line which includes the indexing device, cutter machine, breaker device, take-away conveyor, distributing conveyor, and one of the transfer devices which conveys cross-cut strips to the secondary lines;

FIGURE 4 is a diagrammatic view in elevation of the components illustrated in FIGURE 3;

FIGURE 5 is a plan view of a secondary line illustrating the various components employed to further size the cross-cut strips of glass transferred to the secondary line by one of the transfer conveyors;

FIGURE 6 is a view in elevation of the secondary line taken on the line VI—VI of FIGURE 5 and on the line VI—VI of FIGURE 1;

FIGURE 7 is a time and glass position graph illustrating the relative positions of four stock sheets of glass and cross-cut strips made therefrom on the primary line with the time being plotted in seconds as the ordinate and the distance traveled in feet as the abscissa. Schematically illustrated also in FIGURE 7 are the various components of the primary line;

FIGURE 7a is an enlarged view of a portion of FIGURE 7;

FIGURE 8 is a top plan view of a take-away conveyor which receives the cross-cut strips of glass from the breaker device. A portion of the conveying device is broken away to illustrate the two speed drive mechanism;

FIGURE 9 is a view in elevation of the take-away conveyor illustrated in FIGURE 8;

FIGURE 10 is a plan view of the primary line distributing conveyor with a transfer conveyor positioned in overlying relation therewith. It also shows a portion of the take-away conveyor;

FIGURE 11 is a view in elevation of the distributing conveyor and transfer conveyor illustrated in FIGURE 10;

FIGURES 19a through 19f show progressive positions of a scored stock sheet and the manner in which the detectors PR5 and PR4 operate to control the speed of the take-away conveyor.

Figure 2:
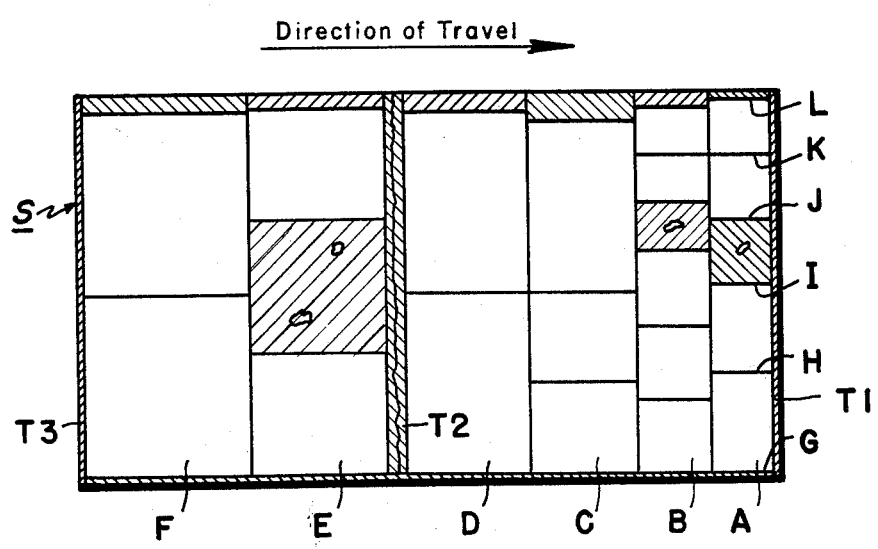
FIGURE 2 is a diagrammatic plan view of a stock sheet of glass and a typical number of pieces having predetermined sizes which can be cut from the sheet with my apparatus.

Referring to the drawings and more particularly to FIGURE 2, there is illustrated a typical stock sheet S of glass which is to be cut to obtain the sizes indicated therein. Sizes A, B, C, D, E and F are called cross-cut strips and the stock sheet is scored transversely on the primary cutter hereinafter described to provide the cross-cut strips. Cross hatched narrow strips T1, T2 and T3 are also scored on the primary cutter and are disposed of at the exit of the primary breaker. The various longitudinal cuts to provide the preselected rectilinear sizes are accomplished in the various secondary lines hereinafter described. For example, in the first secondary line, cross-cut strip A is scored transversely along the lines G, H, I, J, K and L and is broken in the secondary breaker of that particular secondary line to provide four usable cut pieces of glass of the indicated predetermined dimensions. The cross hatched segments such as, for example, the piece in cross-cut strip A between score lines I and J, has an imperfection and is discarded. Edge portions on each end of the cross-cut strip A are also discarded.

Figure 1:
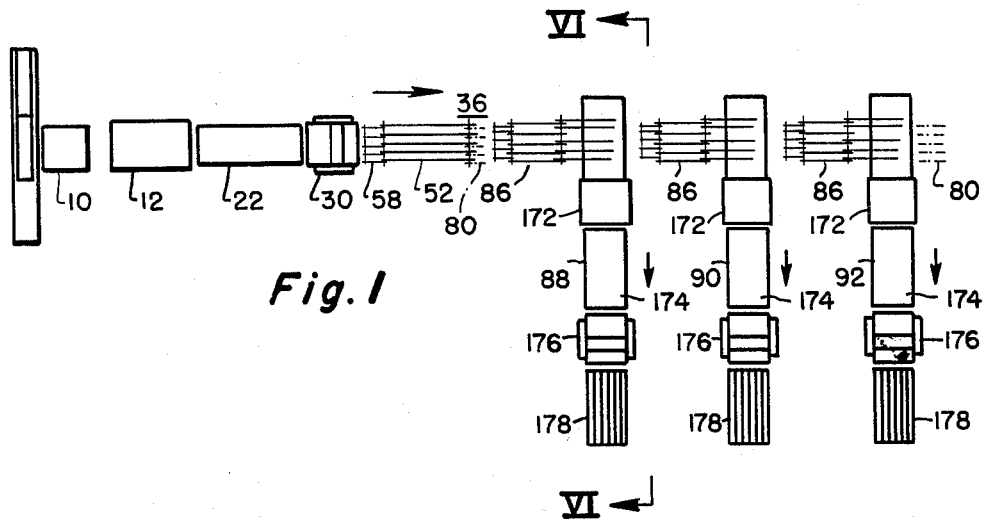
FIGURE 1 is a general diagrammatic plan view of the apparatus for handling and cutting stock sheets of glass as constructed in accordance with this invention.

Referring to FIGURES 1, 3 and 4, the stock sheet S from receiver 10 is positioned on the indexing table 12. As illustrated in FIGURE 3, the indexing table 12 has a power driver roller conveyor 14 comprising a plurality of powered skewed rollers 14a which urge the stock sheet against a plurality of wheels 16 mounted on vertical axles. The wheels 16 serve as edge guide wheels for the stock sheet and index one edge of the sheet. The indexing table 12 has a first sensing device 18 and a second sensing device 20 diagrammatically illustrated in FIGURES 3 and 4. Since the indexing table has power driven conveying means, which are the skewed rollers 14a, a sensing means must be provided to regulate the actuation of the roller conveyor 14, otherwise stock sheets would be fed from the indexing table 12 to the scoring device or cutting machine 22 while other stock sheets were being scored in the cutting machine 22.

The sensing devices 18 and 20 are preferably limit switches, the limit switch 18 being at the entrance end of the indexing table and the limit switch 20 being at the exit end of the table. The roller conveyor 14 starts and stops with the conveyor 24 of the cutting machine 22. The cutting machine 22 is so constructed that the conveyor belt 24 is stopped while the stock sheet is being scored transversely to form a cross cut in the stock sheet. The logic for the control of the indexing table is as follows. The conveyor 14 will start if the cutter conveyor 24 starts, whether or not limit switch 20 is actuated by the presence of glass. The conveyor 14 will stop if the cutter conveyor 24 stops and if limit switch 20 is actuated by the presence of a piece of glass. The indexing conveyor 14 will start if the cutter conveyor 24 is stopped and if limit switch 20 is not actuated by the presence of a piece of glass and if limit switch 18 is actuated by the presence of a piece of glass.

The cutting machine 22 may be of known construction and includes a cutter bar having a plurality of cutting wheels arranged thereon. The cutter bar schematically shown and designated by reference numeral 26 in FIGURE 4 is arranged to travel transversely across the cutting machine 22 and provide a plurality of transverse scores or cuts in the stock sheet. The cutting machine 22 has a plurality of vertical wheels 28 which maintain one edge portion of the stock sheet along a predetermined line. A front edge indicating device, not illustrated, aligns the front edge of the stock sheet. The cutter bar 26 is then actuated to provide the plurality of transverse score lines. After the stock sheet has been scored by cutting machine 22, the conveyor 24 is again actuated to feed the stock sheet from the cutting machine 22 to a breaker device 30. The breaker device may be of conventional construction and arranged to break the stock sheet along the transverse score lines to provide a plurality of cross-cut strips A through F (FIGURE 2).

Schematically illustrated in FIGURE 4 is the breaker device 30 which has a lower conveyor belt 32 and an upper conveyor belt 34. The lower and upper conveyor belts 32 and 34 are spaced from each other and are arranged to convey the scored stock sheet therebetween. Suitable breaking means, such as breaker rollers, are arranged at the exit end of the breaker 30 and break the stock sheet along the transverse score lines so that the cross-cut strips, as for example, strips A through F, and trim strips T1, T2 and T3 are broken from the stock sheet. There are several detectors arranged adjacent the exit end of breaker 30. In the present embodiment there are three detectors which are photoelectric sensors consisting of photoelectric cells PR4, PR5 and PR6 and light sources PR4L, PR5L and PR6L, respectively. The photocells are centrally located above end roller 60 of section 146 of the transfer conveyor 86. The light sources for each of the photocells PR6, PR5 and PR4 are located below the cells and near one edge of the section 146 of transfer conveyor 86 (see in particular FIGURES 8 and 19a). The light sources of photocells PR6, PR5 and PR4 are illustrated in FIGURES 8 and 19a as PR6L, PR5L and PR4L, respectively. The first detector PR6 is associated with the counting circuit illustrated schematically in FIGURE 16. Two other detectors PR5 and PR4 are employed to control the speed of the take-away conveyor generally designated by the numeral 36. The detectors PR6, PR5 and PR4 may be any suitable devices which will detect the presence of glass in a given plane.

The take-away conveyor 36 is illustrated in detail in FIGURES 8 and 9 and includes a supporting frame 38 which carries a pair of horizontal shafts 40 and 42. The horizontal shaft 42 is connected by means of sprocket 44 and chain 46 to a two speed device generally designated by the numeral 48. The shafts 40 and 42 have a plurality of V belt sheaves 50 around which extend V belts 52. There are intermediate supports 54 for the upper run of the V belts 52 between the spaced sheaves 50. Thus, the drive mechanism 48 through chain 46 drives shaft 42 which, in turn, propels the plurality of spaced belts 52 to convey sheets of glass positioned thereon. The shaft 40 has other V belt sheaves 56 secured thereto and rotatable therewith. Other spaced V belts 58 extend around elongated end rollers 60 and sheaves 56 to provide another portion of the conveying means conveyor belting on the take-away conveyor 36. Suitable take-up means 62 and 64 maintain the V belts under predetermined tension so that they may be driven and convey glass positioned thereon.

The take-away conveyor 36 is a two speed machine. The lower speed is substantially equal to the speed of the breaker 30. The higher speed is substantially greater than the speed of the breaker and is used to uniformly space the cross-cut strips of glass A through F on the take-away conveyor. In FIGURES 8 and 9 the two speed drive mechanism 48 is illustrated. The motor 66 is a double ended drive shaft type motor having an over-running clutch 68 and an electric clutch 70. The over-running clutch 68, when engaged, drives a shaft 72 slower than the motor 66. The electric clutch 70, when energized and engaged, drives shaft 72 faster than motor 66. Under normal conditions the electric clutch 70 is disengaged and the motor drives the shaft 72 through over-running clutch 68 at the lower speed. However, when the electric clutch 70 is engaged, the shaft 72 is driven at a higher speed and the over-running clutch 68 disengages shaft 72 from the one end of electric motor 66. The shaft 72 is connected through a flexible coupling 74 to a speed reducer 76. The speed reducer 76 is in turn connected through chain 46 to sprocket 44 so that electric motor 66 drives shaft 42 and hence drives the take-away conveyor 36 at one of two preselected speeds.

Figure 14:
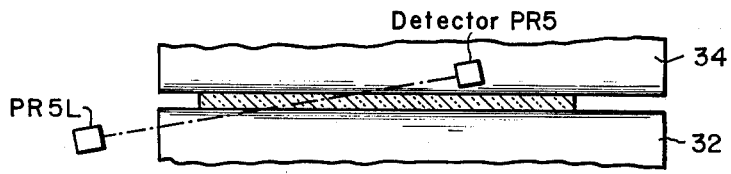
FIGURES 14 and 15 are diagrammatic sections taken on the line XIV—XIV and XV—XV, respectively, of FIGURE 3, showing the detectors PR5 and PR4 which control the speeds of the two speed take-away conveyor in accordance with the length of the cross-cut strips issuing from the breaker.
Figure 15:
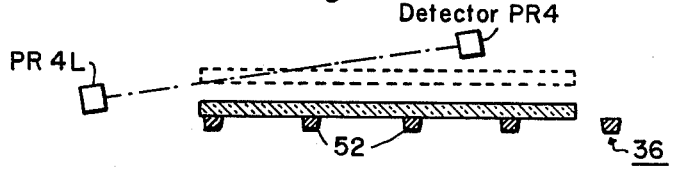

FIGURES 8, 9, 14, 15 and 19a through 19f indicate the relative position of detectors PR5 and PR4. The detector PR5 is positioned substantially adjacent to the end of breaker 30. Detector PR4 is spaced a predetermined distance downstream from detector PR5. For example, detector PR4 may be positioned approximately 8 inches from detector PR5. Detectors PR5 and PR4 are arranged in substantially the same horizontal plane so that a cross-cut but unbroken strip of glass emerging from breaker 30 and having a dimension in the direction of travel greater than 8 inches, will be detected by both detectors PR5 and PR4. If the cross-cut but unbroken strip has a dimension less than 8 inches, the cross-cut strip will be detected only by detector PR5. The strip will be broken by the breaker 30 and fall onto the take-away conveyor 36 before it can be detected by detector PR4. For example, in FIGURE 15 there is illustrated in solid lines how a cross-cut and broken off strip of less than 8 inches which has fallen onto the take-away conveyor 36 is not detected by detector PR4. If the cross-cut but not broken off glass strip has a dimension greater than 8 inches, it is detected by detector PR4 as illustrated by the dotted lines in FIGURE 15. It also is detected by detector PR5 as shown in FIGURE 14.

Figure 17:
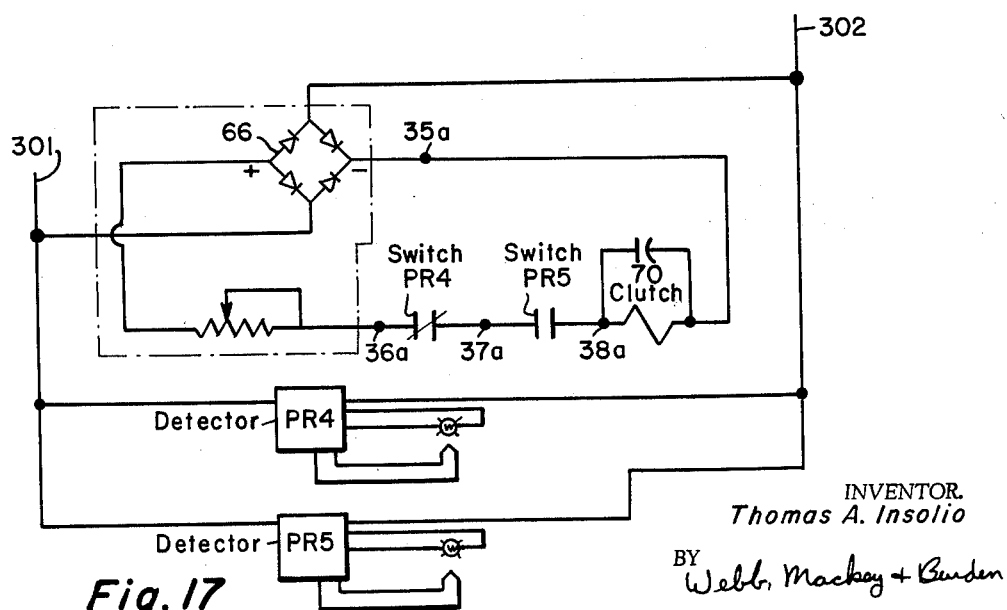
FIGURE 17 is a circuit diagram of the control device for the two speed take-away conveyor.

The electric circuit for controlling the speed of take-away conveyor 36 is illustrated in FIGURE 17. Let it be assumed that the speed of the conveyor of breaker 30 is 120 feet per minute, and that the speed of the take-away conveyor 36 is either 120 feet per minute or 180 feet per minute. The electric circuit is such that the take-away conveyor 36 will operate at 120 feet per minute when the beams of both detector PR5 and detector PR4 are interrupted or when neither of these beams is interrupted. The take-away conveyor will operate at 180 feet per minute when the beam of detector PR5 is interrupted, but the beam of detector PR4 is not interrupted. When neither the beam of detector PR5 nor the beam of detector PR4 is interrupted, switch PR5 is open and switch PR4 is closed. Accordingly, the take-away conveyor 36 operates at 120 feet per minute. When the beam of detector PR5 is interrupted but the beam of detector PR4 is not interrupted, switch PR5 is closed and switch PR4 is closed. Accordingly, the take-away conveyor operates at 180 feet per minute. When the beams of both detector PR5 and detector PR4 are interrupted, switch PR5 is closed and switch PR4 is open. Accordingly, the take-away conveyor 36 operates at 120 feet per minute. Electric clutch 70 (38a–35a) is normally disengaged. When the sheet emerges from the breaker 30, its leading edge is detected by detector PR5. Detector PR5 then closes switch PR5 (37a–38a) to energize the clutch 70. The speed of take-away conveyor 36 increases and creates a spacing between the leading edge of the sheet in the breaker and the trailing edge of the preceding cross-cut strip which is on the take-away conveyor. If the sheet in the breaker extends 8 inches or more beyond detector PR5, detector PR4 senses the leading edge and switch PR4 (36a–37a) opens to deenergize clutch 70. Take-away conveyor 36 is then slowed down to the lower speed. If the unbroken sheet in the breaker 30 extends a long distance beyond the breaker, i.e., for a distance greater than about 8 inches, it will bend of its own weight and touch the take-away conveyor 36 before it is broken off from the stock sheet by the breaker 30. To prevent scratching of the glass sheet, it is highly desirable that both the glass sheet and the take-away conveyor 36 be moving at the same speed. This is accomplished by my device. When the strip breaks off, it falls onto the take-away conveyor 36 and the leading edge of the next sheet causes the speed-up to follow, that is, the leading edge is detected by detector PR5 and closes switch PR5 to again actuate clutch 70 to speed up the conveyor. In this manner, it is possible to uniformly space the cross-cut strips on the take-away conveyor 36 as they are broken off by the breaker device 30, even though the cross-cut strips are of different widths.

Reference is now made to FIGURES 19a through 19f, which further illustrate the manner of operation of the detectors PR5 and PR4. In these figures, a 42" long strip scored and broken along the lines x and y is step by step fed onto the take-away conveyor 36 through the photoelectric beams of photocells PR5 and PR4. The first glass strip a is 24" long, the second stop b is 6" long and piece c is 12" long. The distance between the beams of detectors PR5 and PR4 is 8" so that the photocells PR5 and PR4 function as previously described to speed up and slow down the take-away conveyor 36 to properly space the uneven size strips as they pass and to preevnt scratching of the longer pieces.

The take-away conveyor 36 receives cross-cut strips from the breaker 30 and delivers them to a distributing conveyor 80. The take-away conveyor 36 is of sufficient length to receive all of the cross-cut strips from a stock sheet S, the cross-cut strips being spaced on the take-away conveyor in the manner described. After all of the cross-cut strips from a single stock sheet have been deposited in spaced relationship on the take-away conveyor, the conditions will be as shown in FIGURE 19a, i.e., neither the beam of detector PR5 nor the beam of detector PR4 is interrupted. The take-away conveyor 36 thus operates at a speed of 120 feet per minute which is the speed of the conveyor of breaker 30 and the speed of the distributing conveyor 80.

As illustrated in FIGURES 1, 3, 4, 10 and 11, the distributing conveyor generally designated by the numeral 80 extends from the takeaway conveyor 36 and forms the remainder of the primary line. The distributing conveyor 80 comprises a plurality of spaced V belts 82 which are driven by a conventional driving means at a constant predetermined speed. Driving means for the distributing conveyor 80 is not illustrated. The V belts 82 of conveyor 80 extend around sheaves 84 which are rotatably positioned on shaft 42 of take-away conveyor 36 (see FIGURES 8–11). The distributing conveyor 80 extends lengthwise from the take-away conveyor 36 and positioned in overlying relation with the distributing conveyor 80 are a plurality of transfer conveyors 86.

The transfer conveyors 86 (see FIGURES 10 and 11) are similar in construction so that only one transfer conveyor will be described. The transfer conveyors 86 are arranged to selectively and sequentially pick off cross-cut strips of glass and transfer them to secondary lines. For example, in FIGURE 1 there are illustrated three secondary lines generally designated by the numerals 88, 90 and 92. It should be understood that any number of secondary lines can be positioned to receive various cross-cut strips of glass from the distributing conveyor 80. In FIGURE 1, because of space limitations, only three secondary lines 88, 90 and 92 are illustrated. However, to properly size the stock sheet S of glass illustrated in FIGURE 2, six transfer conveyors 86 and six secondary lines would be employed. Since the secondary lines are of substantially the same construction, only one secondary line will be described in detail.

A transfer conveyor 86 is illustrated in detail in FIGURES 10 and 11. The means for selectively transferring cross-cut strips of glass is illustrated in detail in FIGURES 12 and 13. The transfer conveyor 86 has an inclined section 94 and a horizontal section 96 which are aligned with and travel in the same direction as the distributing conveyor 80. A frame 98 supports the transfer conveyor 86 in overlying relation with the distributing conveyor 80. The support frame 98 carries a drive mechanism 100 which is connected by means of a chain 102 to a drive sheave 104 nonrotatably secured to shaft 106. A plurality of spaced V-belt sheaves 108 and 110 are also nonrotatably secured to the shaft 106. A shaft 112 has other sheaves 114 and 116 positioned thereon in nonrotatable relation thereto. The shaft 112 is suitably supported in bearings so that it is rotatable with the sheaves 114. A first set of V-belts 118 extend around sheaves 108 and 114 and are arranged in spaced relation to each other. The V belts 118 are driven by the shaft 106 to convey cross-cut strips of glass upwardly thereon in the direction indicated by the arrow in FIGURE 11. Suitable take-up means 120 maintain the V belts 118 in proper driving relation with the respective sheaves. Intermediate support means 122 support the upper run of the V belts 118 between sheaves 108 and 114. The horizontal section 96 of transfer conveyor 86 has other V belts 124 extending at one end around drive sheaves 110 on shaft 106 and at their other end around sheaves 126. The sheaves 126 are individually mounted on bearings between rolls 128, later described. Suitable take-up means 130 and intermediate support means 132 are provided to maintain proper tension on the V belts 124 and support the upper run between the sheaves 110 and 126. With this arrangement there is an endless conveyor provided between shaft 112 and idler sheaves 126. Both the V belts 118 and 124 are driven by the common drive means 100 at the same speed. The frame 98 carries a subframe 134 which is pivotally secured at one end and connected to a pressure actuated device 136. The subframe 134 rotatably carries a plurality of rollers 128 which have sprockets 138 secured to their end portions. A chain 140 drives the sprockets 138 to rotate the rollers 128 in either direction as indicated by the arrows in FIGURE 10. The drive mechanism for the chains 140 may be conventional reversible motors, not shown. Positioned adjacent the sprockets 138 are a plurality of horizontally positioned freely rotatable wheels 142. The V belts 124 are positioned between certain of the rollers 128. Thus when the pressure actuator 136 is in a retracted position the V belts are in a plane above the rollers 128. A sensing device 144 such as a sonic beam receptor senses the presence of a cross-cut strip of glass and actuates the pressure actuator 136 to raise the subframe 134 so that the rollers 128 are in a plane above the upper run of V belts 124. With this arrangement a cross-cut strip of glass is conveyed up the inclined section 94 to the horizontal section 96 by means of V belts 118 and 124. When the cross-cut strip of glass progresses to a position where it strikes the wheels 142, the sensing device 144 senses the presence of the glass and elevates the subframe 134. The rollers 128 are arranged to convey a cross-cut strip of glass in either direction so that one direction can be employed to discharge cross-cut strips of glass not suitable for further processing and the other direction is employed to convey the cross-cut strips of glass to a secondary line, in this instance line 88 of FIGURE 1.

Figure 12:
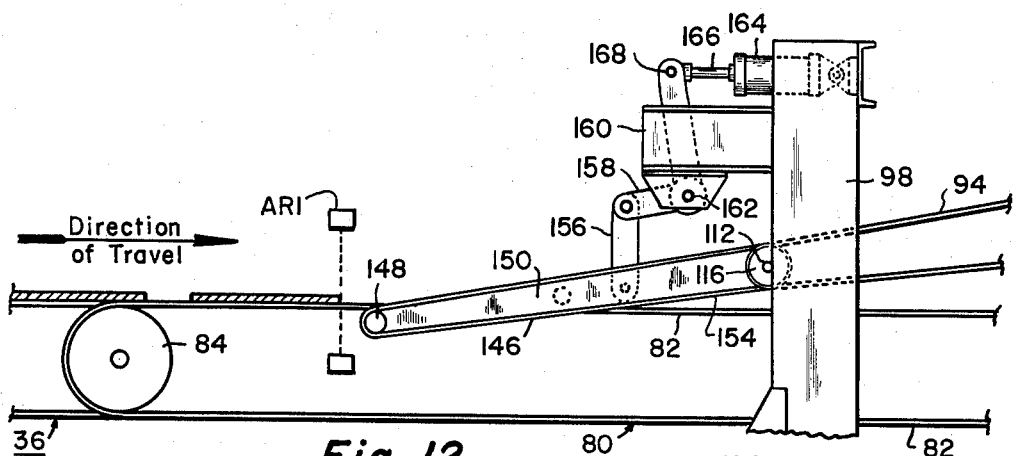
FIGURE 12 is an enlarged detail view of the pivotal end portion of the transfer conveyor as it is picking off a preselected cross-cut strip of glass from the distributing conveyor.
Figure 13:
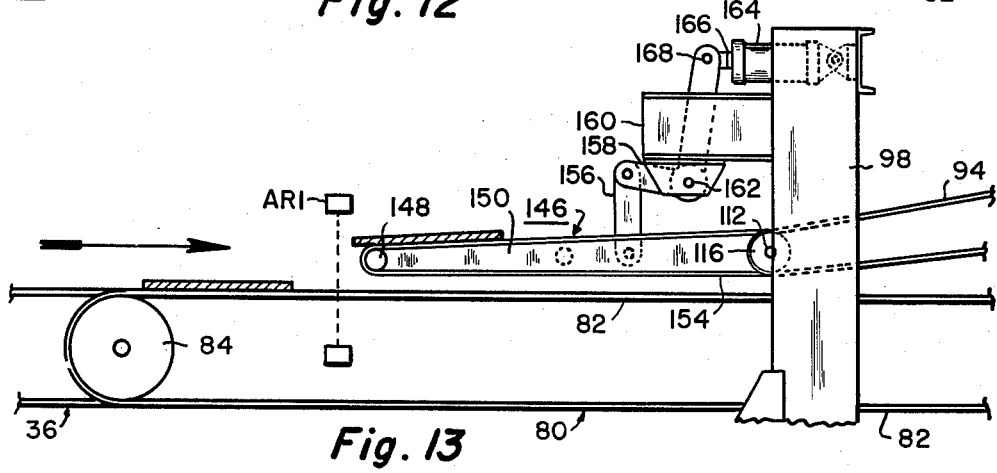
FIGURE 13 is another view in elevation of the transfer conveyor similar to FIGURE 12, wherein the pivotal end portion is in its raised position to permit other crosscut strips of glass to pass under it on the distributing conveyor.

The front end of the inclined portion 94 includes a pivotal portion generally designated by the numeral 146. The shaft 112 has sheaves 116 nonrotatably secured thereto. Other sheaves 148 are rotatably secured to support members 150 pivoted on the shaft 112 and connected by a cross member 152. V belts 154 extend around sheaves 116 and 148 and are positioned so that they are between the V belts 82 of distributing conveyor 80. With this arrangement the V belts 154 are driven by the shaft 112. The support members 150 are pivotally connected to one end of a lever 156. The lever 156 is in turn pivotally connected at the other end to an L-shaped lever 158. The frame 98 has a horizontal member 160 extending forwardly therefrom and lever 158 is pivotally connected at 162 to the horizontal member 160. A pressure actuated device 164 is secured to the frame 98 and has a piston rod 166 extending outwardly therefrom and pivotally connected at 168 to the other end of lever 158. With this arrangement, actuator means 164 through the lever arrangement, pivots the end portion 146 downwardly between the V belts 82 of distributing conveyor 80 as shown in FIGURE 12, and raises the pivotal end portion 146 above the upper run of the V belts 82, as illustrated in FIGURE 13. Normally the pivotal end portion 146 is maintained in a position such as illustrated in FIGURE 12 and after the preselected cross-cut strip of glass is conveyed onto V belts 154 of pivotal section 146, pressure actuator 164 raises the portion 146 so that subsequent cross-cut strips of glass continue on distributing conveyor 80.

Figure 18:
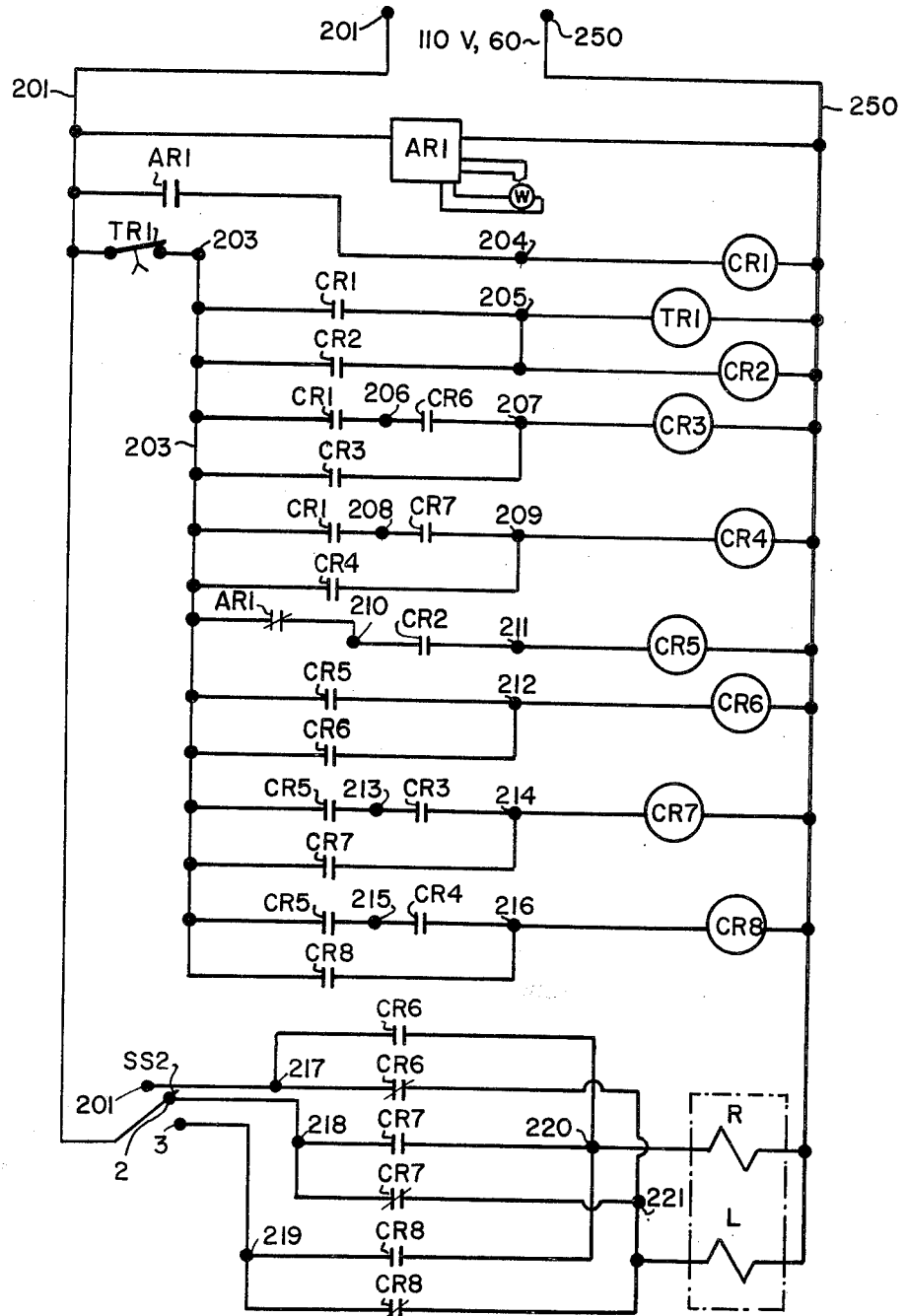
FIGURE 18 is a diagram of the control circuit for a transfer conveyor.

The circuit for the actuation of actuator 164 is set forth in FIGURE 18. The circuit shown in FIGURE 18 includes a selector switch SS2, which can be set to pick up one, two or three cross-cut strips of glass from the distributing conveyor 80 and convey them into its associated secondary line 88, 90 or 92 (FIGURE 1). The following is the circuit description for the transfer of two strips. A sonic type detector AR1 is positioned ahead of the pivotal portion 146 of the transfer conveyor 86 and detects the presence of a strip of glass on the distributing conveyor 80.

In the diagram of FIGURE 18, there is shown an electrical 110 volt, 60 cycle circuit which is powered from two conductors 201 and 250. This circuitry contains numerous relays identified as CR1, TR1, CR2, CR3, CR4, CR5, CR6, CR7 and CR8, and numerous switches that are caused to open or close when the relays are energized and which are identified by identical numbers (CR1, TR1, etc.).

When the pivotal portion 146 of transfer conveyor 86 is lowered, as in the position shown by FIGURES 11 and 12, the sonic beam AR1 (201–250) is normally uninterrupted. For the purposes of this description, the lowered position of the pivotal portion 146 with the sonic beam AR1 (201–250) uninterrupted will be regarded as its "normal" position. In this position, the switch AR1 (201–204) is open and switch AR1 (203–210) is closed. Also switches TR1 (201–203), CR6 (217–221), CR7 (218–221) and CR8 (219–221) are closed. All other switches, as shown in FIGURE 18, are open.

When the leading edge of the first strip to approach transfer conveyor 86 interrupts the sonic beam AR1 (201–250), the switch AR1 (201–204) closes and switch AR1 (203–210) opens. When the switch AR1 (201–204) closes, it energizes relay CR1 (204–250) which causes switch CR1 (203–205) to close. When switch CR1 (203–205) closes, it energizes both a timer TR1 (205–250) and relay CR2 (205–250) to close and lock into the circuit through switch CR2 (203–205). Since relay CR1 (204–250) has been energized, switch CR1 (203–206) and switch CR1 (203–208) also close but this has no effect since switches (CR6 (206–207) and CR7 (208–209) are open. It may be seen that although some of the switches and relays have been acted upon, as yet there has been nothing to affect the RAISE and LOWER, R and L, solenoids of the diagram.

When the trailing edge of the initial strip which is now proceeding to travel up the end portion 146 of the transfer conveyor 86 passes from between the beam AR1 (201–250) to restore the beam, the switch AR1 (201–204) opens to deenergize relay CR1 (204–250) and switch AR1 (203–210) closes. At this point when switch AR1 (203–210) closes, it causes relay CR5 (211–250) to be energized through closed switch CR2 (210–211). The deenergization of relay CR1 (204–250) has no effect on the relay CR2 (205–250) since this relay has previously been locked through switch CR2 (203–205) and, of course, all the switches CR2 remain closed. The energizing of relay CR5 (211–250) causes switch CR5 (203–212) to close, which, in turn, energizes relay CR6 (212–250) to cause switch CR6 (203–212) to close. When switch CR6 (203–212) closes, it causes relay CR6 (212–250) to be locked into the circuit. Switch CR6 (217–220) also closes but this has no effect at this point since the selector SS2 has been placed on count 2. That is, in accordance with the diagram, the selector switch SS2 has been set on number 2 to "pick up" two strips. Were the selector set on number 1, it may be readily seen that when switch CR6 (217–220) closes and switch CR6 (217–221) opens, the R or RAISE solenoid valve (220–250) of the apparatus would be energized and the L or LOWER solenoid valve (221–250) would be deenergized and the end portion 146 of the transfer conveyor would rise as will be explained in more detail hereinafter. However, since, as shown, the selector SS2 is set on 2, the cycle continues and when the leading edge of a second strip being conveyed along distributing conveyor 80 passes between the beam AR1 (201–250), switch AR1 (203–210) opens and switch AR1 (201–204) closes. Relay CR1 (204–250) is again energized and the switch CR1 (203–205) closes. However, as previously shown, the timer TR1 (205–250) and relay CR2 (205–250) are locked in through switch CR2 (203–205). However, switch CR1 (203–206) now closes to energize the relay CR3 (207–250) which causes switch CR3 (203–207) to close and hence the relay CR3 (207–250) locks into the circuit. It must be remembered that switch CR6 (206–207) is closed because relay CR6 (212–250) is locked into the circuit.

Switch CR3 (213–214), of course, closes when the relay CR3 (207–250) is energized and this switch remains closed so long as the relay CR3 (207–250) is locked into the circuit.

When the trailing edge of the second strip passes from between the beam AR1 (201–250) to restore such beam, switch AR1 (201–204) opens and switch AR1 (203–210) closes to energize relay CR5 (211–250). This causes switch CR5 (203–212) to close again, however relay CR6 (212–250) was previously locked into the circuit. Switch CR5 (203–213) closes and energizes relay CR7 (214–250) through the already closed contacts CR3 (213–214). Switch CR7 (203–214) closes and causes relay CR7 (214–250) to lock into the circuit. Switch CR7 (218–220) also closes and switch CR7 (218–221) opens and since the selector SS2 is set on 2, this action energizes the R or RAISE solenoid valve (220–250) and deenergizes the L or LOWER solenoid valve (221–250). Such action will cause air to enter into the pneumatic cylinder 164 in a manner to cause the plunger 166 to retract pulling with it the lever 158 which pivotally raises end portion 146 of the transfer conveyor 86.

While the end portion 146 is in its raised position, as shown in FIGURE 13, other strips being conveyed by the distributing conveyor 80 will pass under the transfer conveyor to other stations or to other transfer conveyors in the line that have not picked up their selected number of strips. The timing switch TR1 (201–203) and its associated relay TR1 (205–250) have previously been set to effect a predetermined time delay after the last strip selected by the selector SS2 has passed onto the conveyor. After this predetermined time period which has been set to allow the two strips that have passed on the conveyor to have been processed or substantially processed so as to free the facility for further strips to pass onto the secondary line, the switch TR1 (201–203) will open which as may be seen will cause all of the relays CR2 (205–250), CR3 (207–250), CR6 (212–250) and CR7 (214–250) which had been locked into the circuit to become deenergized. Hence, all of the associated switches which are closed (CR2, CR3, CR6 and CR7) will open and switches CR6 (217–221) and CR7 (218–221) which are open will close and switches CR6 (217–220) and CR7 (218–220) which are closed will open. The L or LOWER solenoid valve will be energized and the R or RAISE solenoid valve will be deenergized so as to cause air to enter into the pneumatic cylinder 164 in a manner to cause the plunger 166 to retract and lower end portion 146.

It may be readily seen that if the selector switch SS2 had been set on position 3 rather than position 2, the pivotal section 146 of the transfer conveyor 86 would not have raised until a third strip had passed onto the conveyor.

Although the closing of switch CR5 (203–213) would have caused the switch CR7 (218–220) to close and the switch CR7 (218–221) to open, this would have had no effect on the solenoid valves R and L since the switches CR8 (219–220) and CR8 (219–221) would have kept the R or RAISE solenoid valve (220–250) deenergized and the L or LOWER solenoid valve (221–250) energized. The relays TR1 (205–250), CR2 (205–250), CR3 (207–250), CR6 (212–250), and CR7 (214–250) would have remained locked into the circuit. When the leading edge of a third strip interrupted the sonic beam AR1 (201–250), switch AR1 (201–204) would again close and switch AR1 (203–210) would open. Relay CR1 (204–250) would again be energized and would cause the switch CR1 (203–208) to close and energize relay CR4 (209–250). (Switch CR7 (208–209) would be closed since relay CR7 (214–250) would be locked into the circuit.) Since relay CR4 (209–250) would be energized, switch CR4 (203–209) would close and relay CR4 (209–250) would be locked into the circuit. When the trailing edge of the third strip passed from between the beam AR1 (201–250) and switch AR1 (203–210) closed (switch AR1 (201–204) would open as previously described), relay CR5 (211–250) would be energized and switch CR5 (203–215) would close. Accordingly, relay CR8 (216–250) would be energized, switch CR8 (203–216) would be closed and the relay CR8 (216–250) would be locked into the circuit. Switch CR8 (219–220) would close and switch CR8 (219–221) would open and the R or RAISE solenoid valve (220–250) would be energized and the L or LOWER solenoid valve (221–250) would be deenergized and the pivotal section 146 of the transfer conveyor 86 would be raisd. Timer switch TR1 (201–203) then would open after the predetermined selected time and all the locked in relays would be deenergized so that the switch CR8 (219–220) would open and switch CR8 (219–221) would close to energize the L or LOWER solenoid valve (201–221) and open or deenergize the R or RAISE solenoid valve (201–220) and the section 146 would lower and the circuit would return to its normal condition.

By setting the selector switch SS2 at the number of strips that it is desired to pick off from the distributing conveyor 80 and transfer to a lateral secondary line, the previously described circuitry causes the inclined portion 146 of transfer conveyor 86 to remain down between the V belts of the distributing conveyor 80 until the preselected number of strips are on the pivoted portion 146 and the inclined section 94 of transfer conveyor 86. The circuit will then raise the pivotal section 146 to permit the remaining strips to pass beneath the transfer conveyor 86 and remain on the distributing conveyor 80. After a predetermined interval, the circuit energizes the solenoid L to lower the inclined portion 146 to be again properly positioned to pick off the desired number of cross-cut strips of glass formed from the next stock sheet. It is readily apparent that the selected number of cross-cut strips transferred to the secondary conveyor 86 can be changed either as the stock sheet S progresses along the distributing conveyor 80 or according to a preselected plan which may be integrated with the overall cutting of the stock sheet.

If there is a totally defective cross-cut strip, the defective strip will be scheduled to be transferred onto a transfer conveyor 86 when it is the leading strip of the train on the distributing conveyor 80. It will then proceed up the inclined conveyor 94 ahead of a good strip. The defective strip is conveyed onto the horizontal portion 96 of the transfer conveyor and the good strip remains on the inclined portion 94 of the conveyor. The conveyor 86 is then stopped. The defective crosscut strip is then directed away from the secondary line on conveyor rollers 128 and is scrapped or salvaged, as desired. The conveyor 86 is again started and the good cross-cut strip is transferred on conveyor rollers 128 to the secondary line in the opposite direction from the defective strip and is further processed.

A typical secondary line 88 is illustrated in FIGURES 5 and 6. The secondary line includes an indexing device 172 which is arranged to index a cross-cut strip, for instance, strip A of FIGURE 2, along one edge. A cutting machine 174 receives the strip from the indexing device 172 and transversely scores the cross-cut strip along a plurality of predetermined parallel lines, for instance along lines G through L of FIGURE 2. The scored cross-cut strip is then conveyed from the cutting machine 174 to a breaker device 176 where the cross-cut strip is broken along the score lines. A take-away conveyor 178 receives the pieces or lites formed from the cross-cut strip. Suitable means for storage or further handling of the glass lites may be arranged in conjunction with the take-away device 178. The small trim strips are discharged between the breaker device 176 and the take-away conveyor 178 into a receiver 180.

In this manner a stock sheet S of glass as illustrated in FIGURE 2 can be quickly and efficiently cut into a number of pieces of preselected longitudinal and transverse dimensions.

Figure 16:
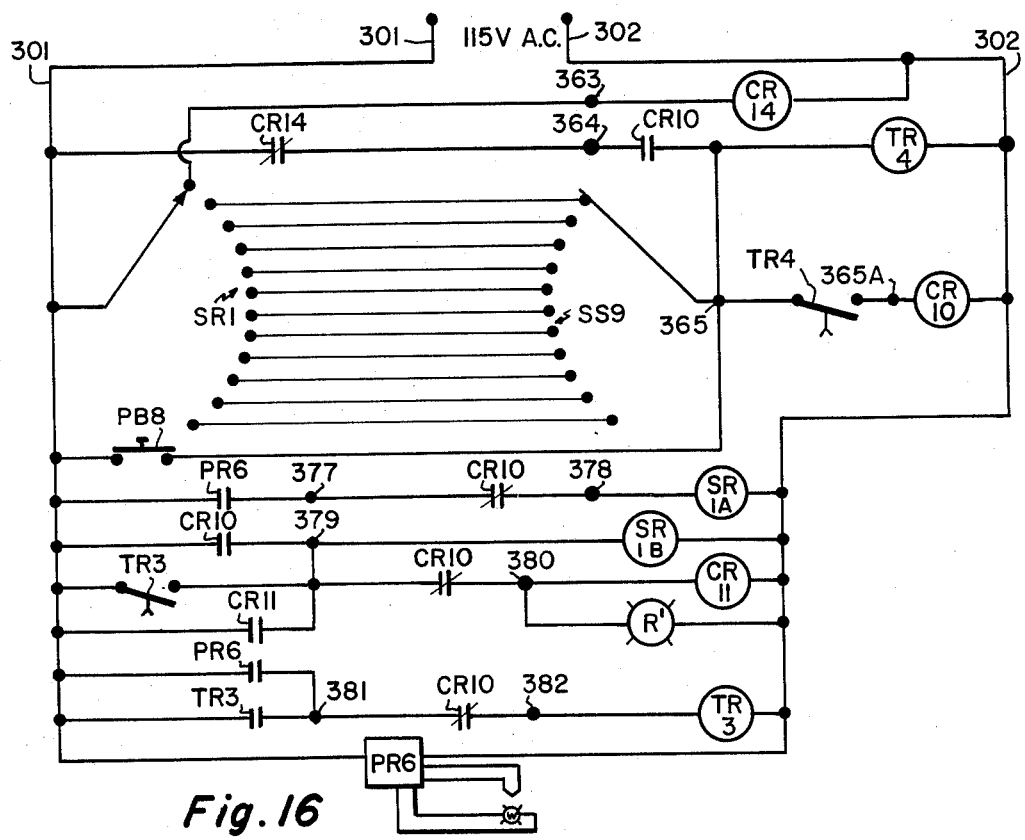
FIGURE 16 is a diagrammatic circuit which counts the number of pieces of glass emerging from the breaker and compares the total number of pieces associated with a given stock sheet with the predetermined number which should be cut from the stock sheet.

The main line and the secondary lines 88, 90 and 92 include counting devices which are employed to monitor the cutting machines and breaking devices. The circuit for the counting devices is shown in FIGURE 16. As previously mentioned, photoelectric cell detector PR6 is positioned adjacent the discharge end of breaker 30. When the plurality of cutters on the cutter bar 26 of cutting machine 22 is set up for a desired pattern, the total number of pieces of glass is preset by means of a selector switch SS9. For example, in FIGURE 2, the count 9 is preset on selector switch SS9 for strips T1, A, B, C, D, T2, E, F, and T3. As the scored stock sheet emerges from the breaker 30, the leading edge is sensed by detector PR6 and registers a count. When a cross-cut strip is broken off from the sheet, the new leading edge of the sheet is then sensed by detector PR6 and also counted. If the total count equals the preset count, then the take-away conveyor 36 continues to convey the cross-cut strips as previously described. If the total count differs from the preset count, the take-away conveyor stops after the last piece has emerged from the breaker 30. All of the cross-cut strips broken from one stock sheet are on the take-away conveyor when it stops. The trimmings T1, T2 and T3 are discharged into a receiver 182 positioned between the take-away conveyor 36 and the breaker 30. An alarm is sounded when the count is not equal to the preset count and the take-away conveyor is stopped. An operator can then inspect the pieces and determine the cause for the incorrect count.

The count control circuit is shown in FIGURE 16 and illustrates the selector switch SS9 which is preset at the time the size setup is made at the cutting machine. When the leading edge of the sheet is detected by detector PR6 then normally open switch PR6 (301–377) closes to energize solenoid relay SR1A (378–302). Relay SR1A (378–302) causes the stepping relay SR1 to advance one count per pulse. Each time normally open switch PR6 (301–377) closes, the stepping relay advances one count. Normally open switch PR6 (301–381) is closed at the first pulse to energize timer relay TR3 (302–382) which locks itself in through normally open switch TR3 (301–381). If the correct number of cross-cut strips are broken off, the count registered on the stepping relay SR1 equals that of selector switch SS9 and relay TR4 (365–302) is energized. Since the last cross-cut strip of glass has passed onto the take-away conveyor 36, no further counts will register on the stepping relay SR1. After a short delay of about one second, switch TR4 (365–365A) closes and energizes relay CR10 (365A–302). Relay CR10 (365A–302) and switch TR4 (365–302) are locked in through normally open switch CR10 (364–365). Normally closed switch CR10 (377–378) is then opened to isolate counting relay coil SR1A (378–302). Normally closed switch CR10 (381–382) opens to deenergize relay TR3 (382–302) before it is timed out. Normally open switch CR10 (301–379) closes to energize relay SR1B (379–302) to zero stepping relay SR1. When stepping relay SR1 is zeroed, relay CR14 (363–302) is energized and switch CR14 (301–364) is opened to deenergize relay TR4 (365–302) and relay CR10 (365A–302) so that the circuit is again ready to count the number of pieces cut from the subsequent stock sheet.

Assuming that one of the cross-cut strips cracks so that there is an excessive number of pieces that are counted by the detector PR6, the circuit illustrated in FIGURE 16 functions as follows. In an excessive count, the stepping relay SR1 will advance beyond the preset count on selector switch SS9. Relay TR4 (365–302) will be deenergized before it has timed out. Timer TR3 (382–302) was energized by the closing of switch PR6 (301–381) as the first sheet of glass was sensed by detector PR6 and was locked in through normally open switch TR3 (301–381). Timer TR3 (382–302) is set to time out just before the first sheet arrives at the end of the take-away conveyor 36. In this time the last cross-cut strip will have passed through the breaker 30. If TR3 (382–302) is not deenergized by a correct count, then switch TR3 (301–379) will time out and close to energize the relay CR11 (380–302) and sound incorrect count signal R' (380-302). Relay CR11 (380–302) is connected to a means which deenergizes the take-away conveyor drive and brings the take-away conveyor and all preceding units to a stop.

If, instead of an excessive number of pieces, no break occurs at one or more of the scored lines, fewer pieces will be counted. In the circuit where fewer pieces are present, relay TR4 (365–302) is not energized and relay TR3 (382–302) times out to stop the conveyor and sound the alarm.

FIGURE 7 illustrates a time-position study of four typical stock sheets of glass M, N, O and P from the time a sheet is positioned on the indexing device 12, is conveyed through the cutting machine 22, the breaker device 30, the take-away conveyor 36 and placed onto the distributing conveyor 80. The conveying means in the breaker device 30 and the distributing conveyor 80 are arranged to travel at a fixed speed as, for example, 120 feet per minute. The take-away conveyor 36 travels part of the time at 120 feet per minute and at other times at 180 feet per minute, as previously explained in connection with FIGURES 19a–19f. The stock sheet N of glass is illustrated in FIGURE 7 as being stopped on the cutting machine 22 for approximately 4 seconds while it is scored transversely. The conveying means associated with the cutting machine 22, when actuated, conveys a sheet of glass at substantially the same speed as the breaker device 30 and the distributing conveyor 80. After the stock sheet has been scored in the cutting machine 22, it is transported to the breaker device 30. The breaker device conveys the stock sheet of glass at substantially the same speed, 120 feet per minute. Depending on the circumstances, as previously explained, the take-away conveyor 36 conveys the cross-cut strips of glass at either 120 feet per minute or 180 feet per minute. At these speeds, if the stock sheet is cut into cross-cut strips each having a width of 8 inches, they will be uniformly spaced at a distance of 4 inches on the take-away conveyor. If, however, certain cross-cut but unbroken strips are of a width greater than 8 inches, the speed of the take-away conveyor is then reduced to a lower speed which is substantially equal to the speed of the breaker conveyor and in this manner uniformly spaces the cross-cut strips of glass on the take-away conveyor. It is apparent with this arrangement that stock sheets of glass can be continuously fed to the primary line and cut into cross-cut strips of desired dimensions, and the cross-cut strips can be transported from the distributing conveyor 80 to the various secondary lines 88, 90 and 92 for further processing. The secondary lines are arranged to convey the cross-cut strips at a lower speed than the distributing conveyor 80 since there are fewer pieces on the respective secondary lines and the interval between the cross-cut strips entering the secondary line is such that a speed less than that of the primary line can be used.

I claim:

1. Apparatus for cutting, transporting and distributing glass sheets, which comprises a primary conveying line and a secondary conveying line extending laterally from said primary conveying line, said primary conveying line including an indexing device arranged to support a stock sheet of glass in a horizontal position and align one longitudinal edge thereof along a predetermined line, a scoring device positioned to receive said stock sheet from said indexing device and to cut a plurality of transverse scores on one surface of said stock sheet at longitudinally spaced intervals, a breaker conveyor positioned to receive said scored stock sheet from said scoring device and to break said stock sheet along said transverse scores into a plurality of cross-cut strips, a distributing conveyor, a take-away conveyor positioned to receive said cross-cut strips from said breaker conveyor and to deliver them to said distributing conveyor, means for operating said take-away conveyor at a higher speed than said breaker conveyor to space said cross-cut strips on said take-away conveyor, and a transfer conveyor arranged to transfer cross-cut strips from said distributing conveyor to said secondary conveying line.

2. Apparatus for cutting, transporting and distributing glass sheets, which comprises a primary conveying line and a secondary conveying line extending laterally from said primary conveying line, said primary conveying line including an indexing device arranged to support a stock sheet of glass in a horizontal position and align one longitudinal edge thereof along a predetermined line, a scoring device positioned to receive said stock sheet from said indexing device and to cut a plurality of transverse scores on one surface of said stock sheet at longitudinally spaced intervals, a breaker conveyor positioned to receive said scored stock sheet from said scoring device and to break said stock sheet along said transverse scores into a plurality of cross-cut strips, a distributing conveyor, a take-away conveyor positioned to receive said cross-cut strips from said breaker conveyor and to deliver them to said distributing conveyor, drive means for driving said take-away conveyor at a first speed which is substantially equal to the speed of said breaker conveyor and at a second speed which is substantially greater than said first speed, speed control means sensitive to the length of unbroken glass emerging from said breaker conveyor for controlling the speed of said take-away conveyor so that it operates at said first speed when said unbroken glass exceeds a predetermined length, and a transfer conveyor arranged to transfer cross-cut strips from said distributing conveyor to said secondary conveying line.

3. Apparatus for cutting, transporting and distributing glass sheets, which comprises:

(a) an in-line primary conveying line;
(b) a secondary conveying line extending laterally from said primary conveying line;
(c) said primary conveying line including an indexing device arranged to support a stock sheet of glass in a horizontal position and align one longitudinal edge thereof along a predetermined line;
(d) a scoring device positioned to receive said stock sheet from said indexing device and to cut a plurality of transverse scores on one surface of said stock sheet at longitudinally spaced intervals;
(e) a breaker conveyor positioned to receive said scored stock sheet from said scoring device and to break said stock sheet along said transverse scores into a plurality of cross-cut strips;
(f) a distributing conveyor;
(g) a take-away conveyor positioned to receive said cross-cut strips from said breaker conveyor and to deliver them to said distributing conveyor;
(h) means for operating said take-away conveyor at a higher speed than said breaker conveyor to space said cross-cut strips on said take-away conveyor; and
(i) a transfer conveyor arranged to transfer cross-cut strips from said distributing conveyor to said secondary conveying line.

4. Apparatus according to claim 3, which includes a plurality of secondary conveying lines and a plurality of transfer conveyors associated therewith, said transfer conveyors arranged to selectively transfer certain preselected cross-cut strips of glass to said plurality of secondary conveying lines.

5. Apparatus for handling sheet glass, comprising a breaker conveyor for conveying a glass sheet and breaking it along transverse score lines to produce cross-cut strips, a take-away conveyor positioned to receive said cross-cut strips from said breaker conveyor, a distributing conveyor positioned to receive said cross-cut strips from said take-away conveyor, drive means for driving said take-away conveyor at a first speed which is substantially equal to the speed of said breaker conveyor and is substantially equal to the speed of said distributing conveyor and at a second speed which is substantially greater than said first speed, speed control means for controlling the speed of said drive means, a first detector positioned adjacent the delivery end of said breaker conveyor and operable to detect the presence of glass, a second detector spaced downstream a predetermined distance from said first detector and operable to detect the presence of glass, and circuit means connecting said first and second detectors and said speed control means and arranged to actuate said speed control means to drive said take-away conveyor as follows:

(a) at said first speed when
(1) both of said detectors detect the presence of glass,
(2) neither of said detectors detects the presence of glass,
(b) at said second speed when said first detector detects the presence of glass but said second detector does not detect the presence of glass.

6. The combination with a scoring device for cutting a plurality of transverse scores on a surface of a glass sheet, a breaker conveyor positioned to receive said scored sheet from said scoring device and to break said sheet along said transverse scores into a plurality of cross-cut strips, and a take-away conveyor positioned to receive said cross-cut strips from said breaker conveyor, of a count control system comprising a detector positioned adjacent the discharge end of said breaker conveyor to detect the presence of glass emerging from said breaker conveyor, an electric circuit including said detector, a selector switch can be preset at a preset count to accord with the number of cross-cut strips desired to emerge from said breaker conveyor and a stepping relay which advances one step each time an edge of glass emerging from said breaker conveyor passes said detector, whereby said stepping relay registers the actual count of cross-cut strips emerging from said breaker conveyor, and means operative to stop said breaker conveyor and said take-away conveyor when said actual count fails to agree with said preset count.

(References on following page)

References Cited by the Examiner

UNITED STATES PATENTS

| | | | |
|---|---|---|---|
| 711,947 | 10/02 | Dittbenner | 198—105 |
| 1,946,356 | 2/34 | Owen | 225—96.5 |
| 2,504,655 | 4/50 | Dallas | 225—2 |
| 2,530,511 | 11/50 | Danner | 225—2 |
| 2,718,960 | 9/55 | Standal | 198—105 |
| 2,948,991 | 8/60 | Walters et al. | 225—96.5 |
| 3,044,216 | 7/62 | Billinger | 225—96.5 |

FOREIGN PATENTS

| | | |
|---|---|---|
| 1,236,148 | 6/60 | France. |

ANDREW R. JUHASZ, *Primary Examiner.*

WILLIAM W. DYER, Jr., *Examiner.*

UNITED STATES PATENT OFFICE
CERTIFICATE OF CORRECTION

Patent No. 3,190,518

June 22, 196

Thomas A. Insolio

It is hereby certified that error appears in the above numbered patent requiring correction and that the said Letters Patent should read as corrected below.

Column 2, line 53, for "increase" read -- to increase --;
column 5, line 46, for "power driver" read -- power driven --;
column 8, line 27, for "second stop" read -- second strip --;
column 16, line 66, for "can be" read -- which can be --.

Signed and sealed this 21st day of December 1965.

(SEAL)
Attest:

ERNEST W. SWIDER
Attesting Officer

EDWARD J. BRENNER
Commissioner of Patents